July 24, 1934.  W. J. COULTAS ET AL  1,967,498
CORN HARVESTER
Original Filed Sept. 27, 1929  4 Sheets-Sheet 3

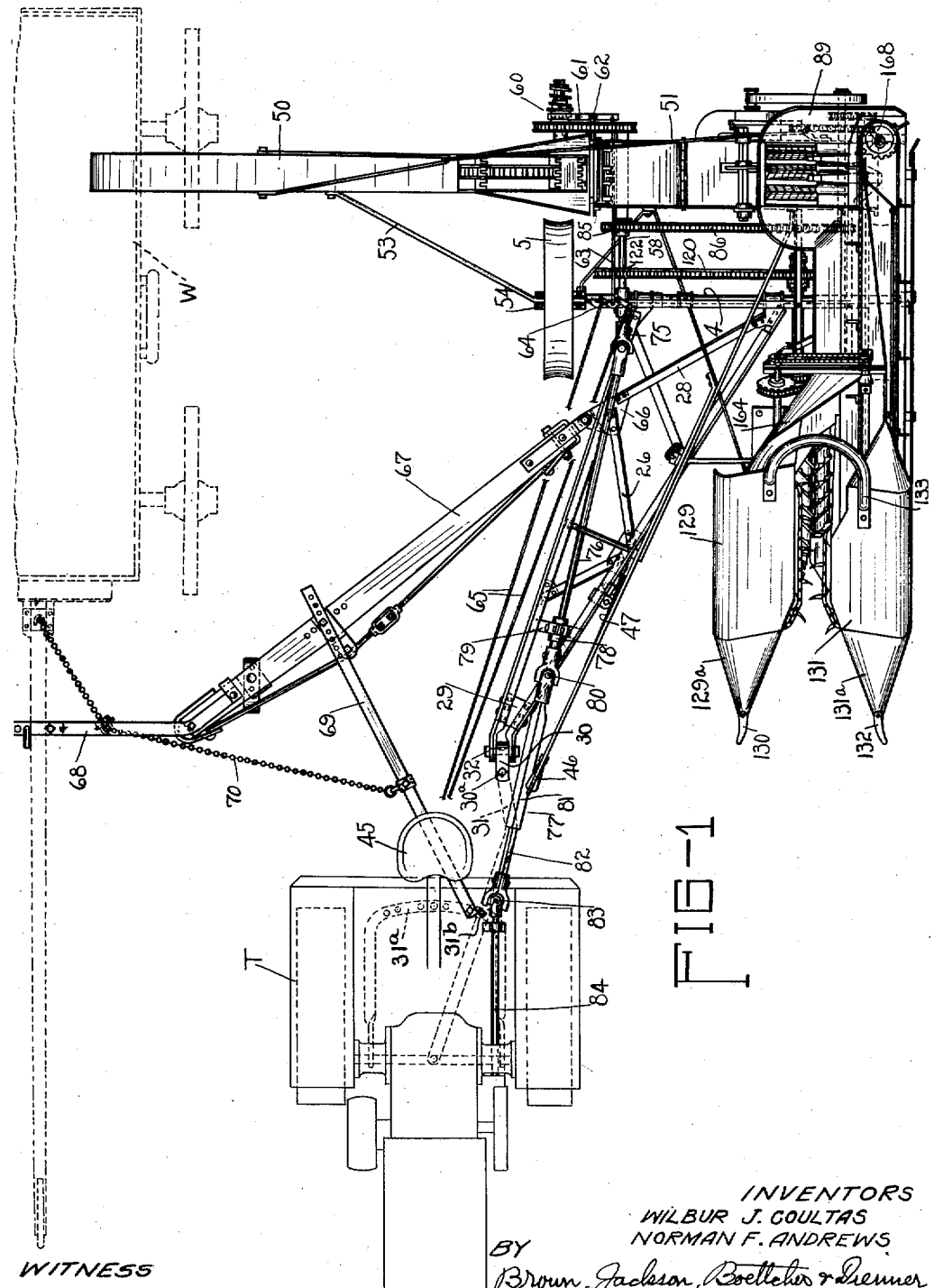

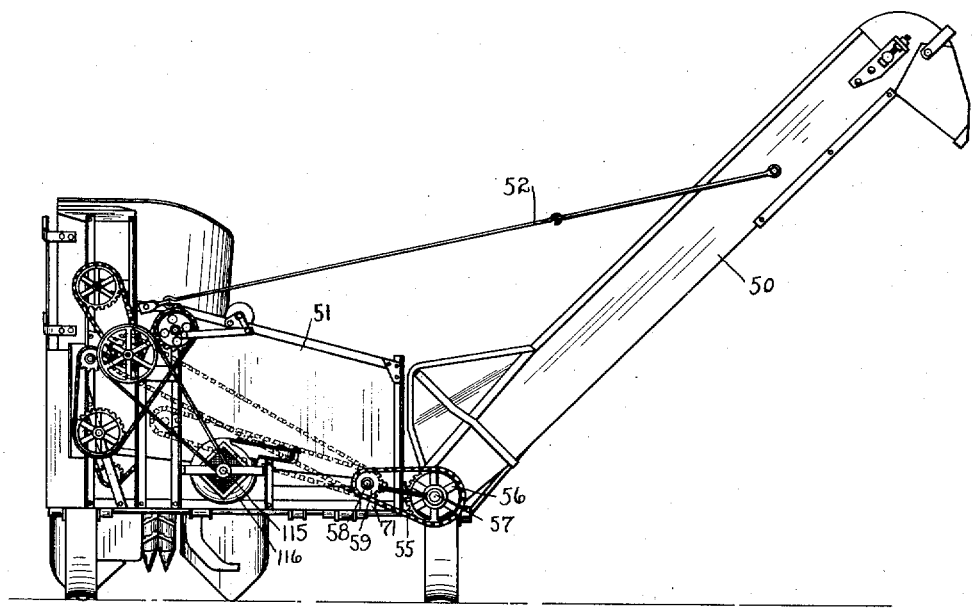
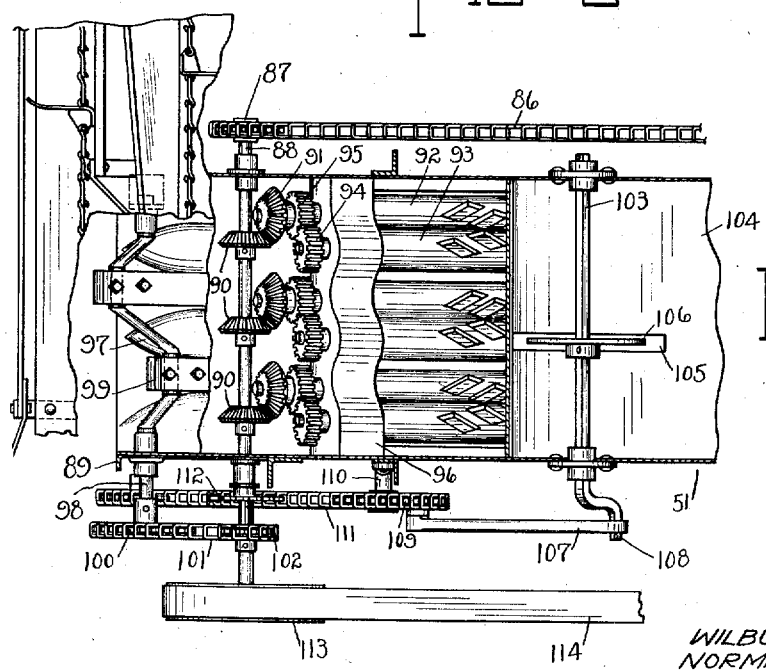

WITNESS
Walter Ackerman

INVENTORS
WILBUR J. COULTAS
NORMAN F. ANDREWS
BY Brown, Jackson, Boettcher & Diemer
ATTORNEYS

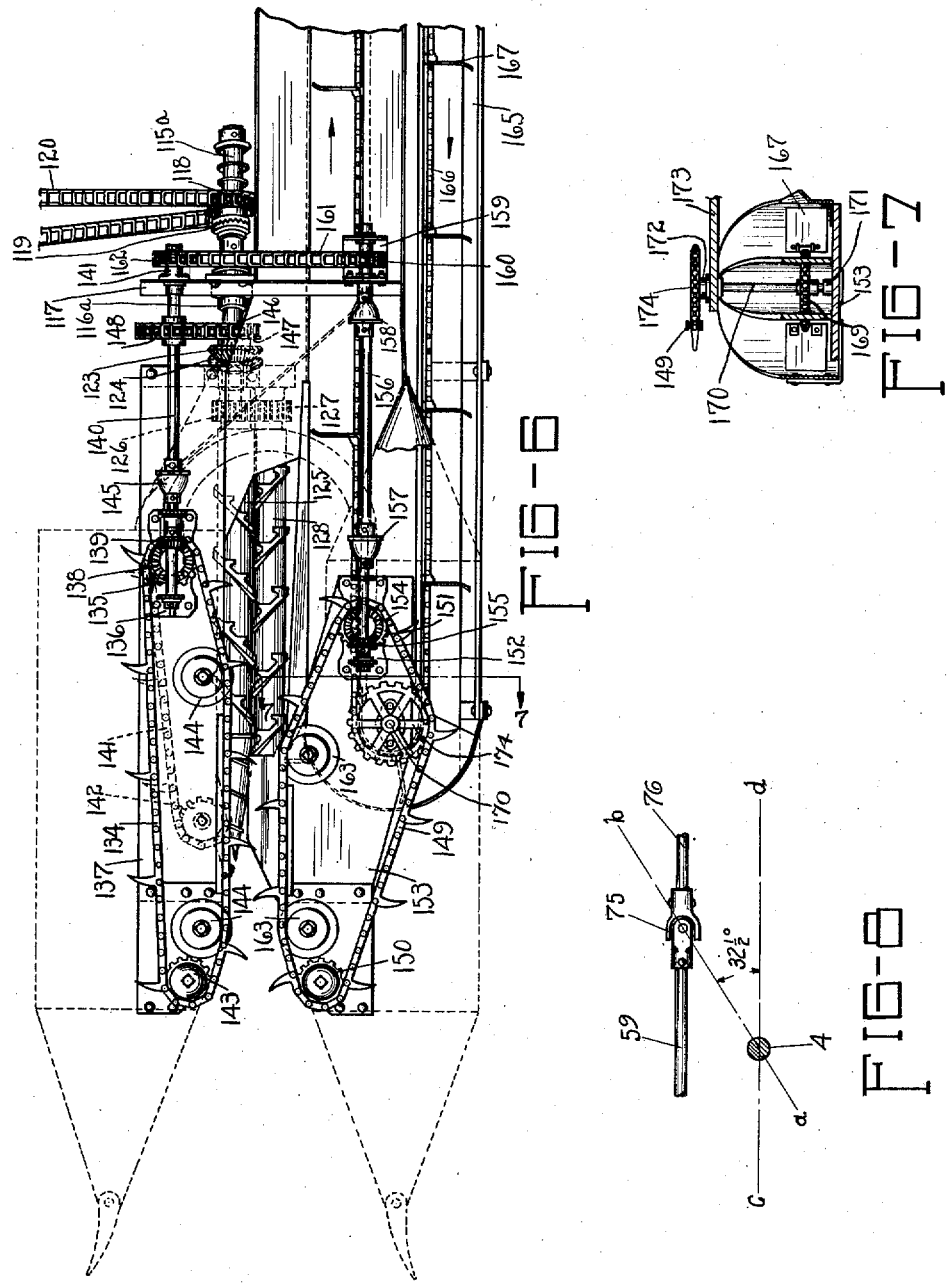

Patented July 24, 1934

1,967,498

UNITED STATES PATENT OFFICE 1,967,498

CORN HARVESTER

Wilbur J. Coultas, Moline, and Norman F. Andrews, East Moline, Ill., assignors to Deere & Company, Moline, Ill., a corporation of Illinois Application September 27, 1929, Serial No. 395,510
Renewed October 27, 1933

32 Claims. (Cl. 56—104)

This invention relates to agricultural implements, and more particularly to a corn harvester adapted to be driven from a tractor which pulls the harvester in the operation thereof.

It is known to provide a transmission shaft by means of which the mechanisms of an agricultural implement are driven from a power take-off shaft of a tractor to which such implement is hitched. In such an arrangement, where the implement is tilted or adjusted about an axis, difficulty is apt to be experienced due to the change in relation between the transmission shaft and the tractor shaft.

One of the objects of our invention is to provide an agricultural implement having a draft member and a transmission shaft so related to each other and the axis on which the implement tilts that the transmission shaft will be maintained in substantially straight-line relation to the tractor shaft regardless of tilting of the implement, thus avoiding possibility of binding of the transmission shaft. Another object is to provide simple and efficient means for mounting the implement frame for tilting movement and for connecting the draft member to the implement for relative turning movement on an axis coincident with the axis about which the frame tilts. A further object is so relatively to dispose the power shaft and associated driving means of the implement as to reduce the use of bevel gears and provide a simple and direct drive between the power shaft and the respective counter-shafts driven therefrom. It is also an object of our invention to provide means for tilting the implement frame, so arranged and connected to the frame as to facilitate adjustment thereof, such means also serving to hold the frame in adjustment. A further object is to provide simplified means for driving the conveyor which delivers the ears of corn from the snapping rolls, in a corn harvester, to the hopper for delivery to the husking rolls. Further objects and advantages of our invention will appear from the detailed description.

In the drawings:

Figure 1 is a plan view of a corn harvester constructed in accordance with our invention, attached to a tractor;

Figure 2 is a rear view of the harvester;

Figure 5 is a detail plan view, on an enlarged scale, of the husking rolls and the hopper and conveyor and associated parts, partly broken away and in section;

Figure 6 is a plan view, on an enlarged scale, of the snapping rolls and gathering chains and conveyor and associated parts, parts being broken away;

Figure 7 is a section taken substantially on line 7—7 of Figure 6.

Figure 8 is a detail illustrating the relation between the axle and the universal joint at the forward end of the implement power shaft.

Figure 3:
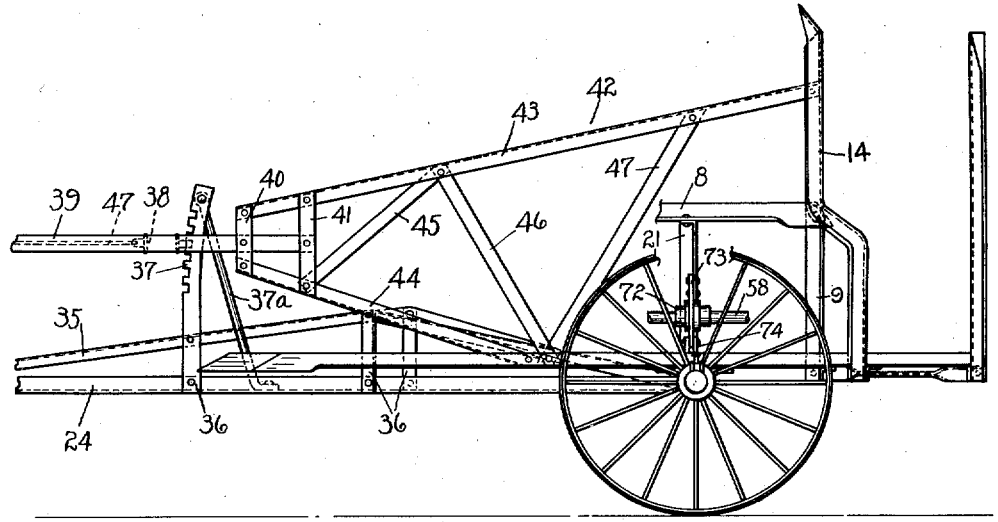
Figure 3 is a side view of the harvester frame and associated parts, looking from the snapping rolls side, part being omitted.
Figure 4:
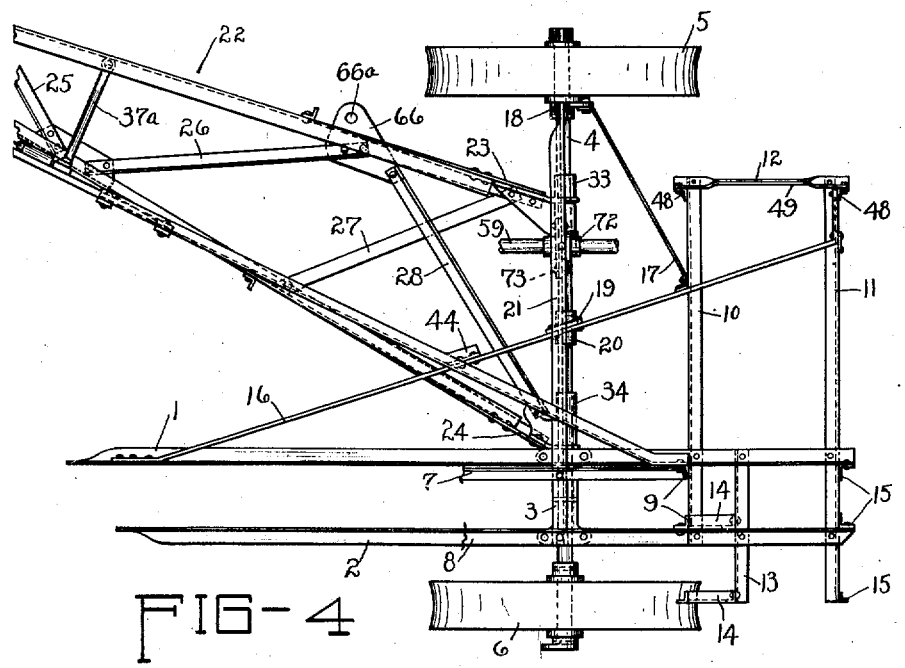
Figure 4 is a plan view of the harvester frame and associated parts.

Referring more particularly to Figures 3 and 4, the main frame of the machine is preferably of angle iron construction and comprises two parallel rails 1 and 2 suitably secured to a sleeve 3, as by being riveted to elements of the sleeve, this sleeve being pinned or otherwise suitably secured on a supporting axle 4. Ground wheels 5 and 6 are rotatably mounted upon the axle at the end portions thereof and support the machine for travel over the ground surface.

Upper rails 7 and 8 are supported above the rails 1 and 2 in a suitable manner, as by means of uprights secured to the lower rails, the rearward ones of such uprights being designated by the reference number 9. The rails 1 and 2 and 7 and 8, and associated parts, constitute a supplemental frame projecting forwardly of the axle, and this supplemental frame carries the snapping rolls, gathering chains and associated mechanisms.

The rails 1 and 2 project rearwardly beyond the axle for a considerable distance and have riveted, or otherwise suitably secured thereto, rails 10 and 11 which are connected at the ends thereof adjacent wheel 5 by a cross member 12. A short rail 13 is secured to rails 1 and 2 between rails 10 and 11, and projects beyond rail 2 to a point adjacent wheel 6. Uprights 14 are secured to rail 13 and have their upper portions off-set forwardly of the rail 13. Angle uprights 15 are secured to rail 1 and rail 11, which projects beyond rail 2 in the same manner as rail 13. The uprights 14 and 15 provide a frame for supporting the hopper which receives the snapped ears of corn. The rails 10 and 11 provide a supplemental frame for supporting the husking rolls and associated mechanism and the elevator for discharging the husked ears. This supplemental frame is reinforced by an inclined brace 16 having its rearward portion secured to rails 10 and 11 and its forward end secured to rail 1.

A second inclined brace 17 has its inner end secured to rail 10, adjacent brace 16, and its outer end secured to a sleeve 18, pinned or otherwise suitably secured upon axle 4 adjacent wheel 5. Brace 16 is also secured to a flange 19 of a sleeve 20 which is pinned or otherwise secured upon the axle. The frame is further braced against transverse stresses by an inclined brace member 21 secured at its lower end to sleeve 18, the upper end portion of this brace member being riveted or otherwise suitably secured to rails 7 and 8. The frame constructed in this manner is comparatively light and possesses great strength and rigidity. It is to be particularly noted that this frame is tiltable fore and aft on the axis of axle 4.

A draft member 22 is provided for attaching the implement to a tractor. This draft member extends forwardly from axle 4 and at an inclination toward the outer side of the machine, the term "outer side" being used with reference to the corn row being harvested, the snapping rolls and associated mechanisms being disposed adjacent wheel 6, and at the side of the machine at which the corn is harvested, this latter side of the machine being therefore considered as the inner side thereof. The draft member comprises angle rails 23 and 24 connected by inclined angle braces 25, 26, 27 and 28.

These rails converge forwardly of the implement and are connected, adjacent their forward ends, by a plate 29, suitably secured thereto. The forward ends of the rails are suitably shaped and spaced to receive between them a loop 30 pivoted, as by pivot bolt 30a, to swing about a vertical axis at the rearward end of a swinging drawbar 31 and suitably attached, in a known manner, to a tractor T of known type. By virtue of the vertical pivot established by the bolt 30a relative horizontal turning movement between the tractor and the corn harvester is permitted. The U-shaped drawbar 31a cooperates with the swinging drawbar 31 to hold the latter in any desired lateral position, the two being connected by a bolt 31b. A connecting pin in the form of a bolt 32 is inserted through loop 30 and the forward ends of rails 23 and 24. Rail 23 is secured, at its rearward end, to a sleeve 33 mounted upon axle 4 for turning movement about the same. The rearward end of rail 24 is secured to a sleeve 34 also mounted upon axle 4 for turning movement thereon. In this manner, the draft member is connected to the implement for relative turning movement about the axis on which the implement has tilting movement. It will be seen, therefore, that tilting of the implement on the axis of axle 4, in the adjustment thereof, has no tendency to either raise or lower the rearward end of the draft member. This is important as maintaining the draft member in substantially horizontal position and in alignment with the connection thereof to the tractor thus avoiding disturbing the relation between the tractor and the transmission shaft mounted upon the draft member, as will be more fully explained.

I preferably provide truss members 35 disposed above the rails of the draft member and having their ends secured thereto.

Each of these truss members is suitably secured, intermediate its ends, to the associated rail of the draft member by an upright 36. I also mount upon rail 24 and the associated truss member 35, an upright 36 formed, at its upper portion, to provide a rack 37. This rack cooperates with a latch 38 of an adjusting lever 39 secured to cross braces 40 and 41 of an adjusting frame 42. This adjusting frame is of forwardly tapering triangular shape and is disposed vertically. The frame 42 comprises an upper angle rail 43 and a lower angle rail 44, these rails being connected by inclined braces 45, 46 and 47. The rearward end of rail 43 is secured to upright 9 which extends from rail 1, and the rearward end of rail 44 is secured to the inclined brace 16. As will be noted more clearly from Figure 3, the rearward ends of the rails 43 and 44, are approximately equidistant from axle 4 rearwardly and forwardly thereof. This facilitates tilting of the frame, by means of lever 39, since when this lever is raised or lowered, the implement frame is subjected, by means of the adjusting frame 42, to a lifting effect at one side of the axle 4 and downward pressure at the other side of the axle. In order that the implement frame may be adjusted from the tractor, lever 39 is extended forwardly to a point adjacent the operator's seat 45 on the tractor, and a latch handle 46 is pivoted on this lever at the forward end thereof, this handle being connected to latch 38 by a pull rod 47, in a known manner.

An inclined brace 37a is secured, at its upper end, to the upper end of upright 36, and has its lower end secured to rail 23.

Uprights 48 are secured to rails 10 and 11, and the cross brace 12, and are connected at their upper ends by a cross brace 49. Referring more particularly to Figures 1 and 2, an elevator 50 is suitably mounted at the inner side of a housing 51 supported by the rails 10 and 11 and the associated uprights. Braces 52 and 53 are attached to the elevator casing and to the supplemental frame which carries the hopper and husking rolls, and a casting 54 secured on axle 4 adjacent wheel 5, respectively. These braces act to support the elevator at an inclination upwardly and inwardly from the harvester and to dispose it so as to discharge the husked ears into a wagon W disposed at the outer side of the harvester. The elevator and the manner of mounting and operating the same is, in general, known and need not be illustrated nor described in detail.

This elevator is driven by a sprocket chain 55 chained about a sprocket wheel 56 loose on the elevator shaft 57, this chain also passing about a sprocket wheel 59 secured on power shaft 58 of the harvester. Sprocket wheel 56 is normally connected to shaft 57 for driving the same through a clutch structure 60 of known type. This clutch is controlled by a clutch lever 61 pivoted at 62 and connected by a rod 63 to a two-armed lever 64 which is pivoted upon brace member 21. The arms of lever 64 have pull cords 65 attached thereto, these cords being led forwardly to a point readily accessible from the operator's seat 45 of the tractor. This provides simple and efficient means for throwing the elevator 50 into and out of operation as required.

The inclined braces 26 and 28 of the draft member 22 are connected to rail 23 of such member by a gusset plate 66. This plate projects beyond rail 23 and provides a pivotal mounting 66a for the rearward end of a beam 67 of a draft connection for attaching the tongue of wagon W to the tractor and the harvester. This connection comprises an extension member 68 at the forward end of the beam 67 and adapted for securement to the wagon tongue, a draft link 69 attached to the tractor and to beam 67, and a draft chain 70, means being provided for securing the forward end of this chain to either link 69 or to the extension member 68, optionally, the rearward end of the chain being secured to the wagon tongue. This draft connection constitutes the subject matter of the Letters Patent No. 1,856,468, issued May 3, 1932 to Wilbur J. Coultas and Carl Frederiksen, for Draft connections, and hence the draft connections need not be illustrated nor described in greater detail here, it being sufficient to note that the present applicants contemplate the use of a suitable draft connection for transporting the wagon and maintaining it in position to receive the husked ears discharged from elevator 50.

Power shaft 58 is rotatably mounted, adjacent its rearward end, in a suitable bearing bracket 71. This shaft is disposed fore and aft of the main frame of the implement and is rotatably mounted in a bearing sleeve 72 secured to a plate 73 riveted to brace 21 and depending therefrom. The sleeve 72 is also secured to arms 74 of a strap which passes about axle 4. As will be noted more clearly from Figure 3, plate 73 is carried by sleeve 72, the upper portion of this plate being secured to brace 21 and the lower portion of the plate being disposed between and secured to fingers 74.

As will be noted more clearly from Figure 1, the implement power shaft 58 extends forwardly for a short distance beyond axle 4. The forward end of this shaft is connected, by a universal joint 75, to the rearward end of a transmission shaft which comprises a rearward section 76 and a forward section 77. Section 76 is mounted for rotation and for endwise movement in a bearing sleeve 78 supported by a bracket structure 79 carried by the draft member 22. At its forward end, section 76 is connected by a universal joint 80 to a tubular member 81 of forward section 77 of this shaft. The bore of member 81 is of non-circular cross-section and receives a correspondingly shaped member 82 of shaft section 77, the forward end of member 82 being connected, by a universal joint 83, to the rearward end of a power take-off shaft 84 of tractor T. Power is thus transmitted from the tractor to the power shaft 59 of the implement for driving the various mechanisms thereof. The telescoping construction of section 77 of the transmission shaft readily accommodates any endwise movement of section 76 of this shaft such as will occur in the operation of the implement, due to tilting thereof about the axis of axle 4.

This telescoping construction of the forward section of the transmission shaft also accommodates turning movement of the tractor relative to the implement. Due to the relation between the axis on which the implement tilts and the connection of the draft member to the implement, the draft member is maintained in a substantially horizontal position thus providing an approximately straight line drive between the tractor take-off shaft 84 and power shaft 58 of the implement, which is advantageous as reducing liability of binding of parts such as would be apt to occur if the draft member moved with the implement in the tilting movement thereof.

Referring more particularly to Figures 1, 2 and 5, a sprocket wheel 85 is secured on shaft 58 and a sprocket chain 86 is trained about this sprocket wheel and about a sprocket wheel 87 secured on the forward end of a counter-shaft 88 rotatably mounted through housing 51 beneath hopper 89. It will be noted that shaft 88 is disposed fore and aft of the implement in substantial parallelism with shaft 58. By arranging the shaft 88 in this manner a direct drive may be had between these two shafts without any necessity of employing an interposed shaft and bevel gearing. Bevel gears 90 are secured on shaft 88 and meshed with bevel gears 91 secured on husking rolls 92.

Each of the rolls 92 has associated therewith a roll 93 which is provided at its upper end with a pinion 94 which meshes with a pinion 95 secured on the upper end of roll 92. The rolls 92 and 93 of each pair of husking rolls are thus geared together for opposite rotation. These rolls are suitably supported in a supporting member 96 which extends across the housing 51 from front to back thereof, the lower ends of the rolls being supported in a known manner. The pairs of husking rolls act to remove the husks from the ears delivered thereto from the hopper, in a known manner, and the husked ears are delivered from the rolls to the elevator 50. The construction and the operation of the husking rolls and the parts associated therewith are known and need not be illustrated nor described in detail.

The bottom wall of hopper 89 is provided with upwardly projecting elements 97 of rounded or arcuate cross-section, these elements being disposed to define therebetween trough-like spaces for directing the ears of corn to the husking rolls. A crank shaft 98 is rotatably mounted in the hopper, fore and aft thereof, this shaft being provided with two cranks which are oppositely disposed. A feeding bar 99 is connected, at one end, to each of the cranks, these bars operating between the elements 97 of the hopper. A sprocket wheel 100 is secured on the rearward end of shaft 98 and is connected, by a sprocket chain 101, to a sprocket wheel 102 secured on shaft 88.

Shaft 98 is rotated in a clockwise direction, as considered in Figure 2, so that the bars 99 are lowered and moved rearwardy from beneath the ears and are then raised and moved forwardly, that is toward the husking rolls, so as to feed the ears to the rolls. These bars and the means for operating the same and feeding the ears from the hopper to the rolls, constitute the subject matter of Letters Patent No. 1,870,420, issued August 9, 1932, to Louis A. Paradise and Wilbur J. Coutlas, for Corn harvester. This particular means for feeding the ears to the rolls need not, therefore, be illustrated nor described in detail here, it being sufficient to note that suitable means is provided by which proper feed of the ears to the rolls is assured. The rolls 92 and 93 may be of the usual type having co-operating projections and depressions for removing the husks from the ears. It will be understood, however, that such feeding means may be omitted, if desired. It is pointed out that crank shaft 98, like shaft 88, is also disposed fore and aft of the implement.

A shaft 103 is suitably mounted for rotation across housing 51 and is disposed fore and aft of the implement. Shaft 103 is positioned above plate 104 which covers the lower portion of the husking rolls. This plate is provided with a slot 105 for reception of an aligning member 106 secured on shaft 103. This shaft is oscillated by means of a pitman rod 107 connected at one end to a crank arm 108 at one end of shaft 103, the other end of this rod being eccentrically connected to a sprocket wheel 109 rotatably mounted upon a stub shaft 110 suitably secured to housing 51.

A sprocket chain 111 is trained about sprocket wheel 109 and a sprocket wheel 112 secured upon counter-shaft 88. Shaft 103 is thus oscillated from shaft 88 and member 106 acts, in a known manner, to properly align with the husking rolls any ears which may get crosswise of the rolls. While I have illustrated but one aligning member 106, any suitable or preferred number of such members may be provided on shaft 103.

A pulley 113 is secured upon the rearward end of counter-shaft 88 and receives a belt 114 passed about the same and about a pulley 115 secured on the shaft of a blower 116 which communicates with the housing 51 beneath the husking rolls. This blower serves to discharge the removed husks from the lower portion of housing 51 in the usual manner.

Referring to Figures 1 and 6, a counter-shaft 115a is rotatably mounted through a bearing sleeve 116a suitably secured to a cross-bar 117 which may conveniently be secured to the inclined brace member 21. A sprocket wheel 118 is mounted upon shaft 115a and is normally operatively connected thereto for driving such shaft by means of a slip clutch structure 119 of known type. A sprocket chain 120 is trained about sprocket wheel 118 and a sprocket wheel 122 secured on power shaft 58. It will be noted from Figure 1 that shaft 115a is disposed fore and aft of the implement and has direct driving connection with power shaft 58 in the same manner as counter shaft 88.

A bevel gear 123 is secured upon the forward end of counter-shaft 115a and meshes with a bevel gear 124 secured upon the upper end of snapping roll 125 which is rotatably supported in a suitable manner. A spur gear 126 is secured upon roll 125 and meshes with a spur gear 127 secured upon roll 128, which cooperates with roll 125 for snapping the ears from the corn stalks, in a known manner.

Roll 125 has associated therewith a sheet metal housing and shoe structure 129 having a forwardly tapering front portion 129a from which extends a point 130. A sheet metal housing and shoe structure 131 is associated with roll 128 and is provided with a forwardly tapering front portion 131a from which extends a point 132. The structures 129 and 130 are preferably connected by a bow 133. Structure 129 provides a housing which encloses an upper gathering chain 134 of known type. This chain passes, at its upper end, about a sprocket wheel 135 secured on a stub shaft mounted in a mounting bracket 136 suitably secured to a plate 137 disposed within structure 129. A bevel gear 138 is secured on the upper end of this stub shaft and meshes with a bevel pinion 139 secured on the forward end of a shaft 140 suitably mounted for rotation in bracket 136 and in a bearing sleeve 140 secured to cross-bar 117.

A second gathering chain 141 is disposed beneath plate 137 and passes about a second sprocket secured on the stub shaft upon which sprocket 135 is secured, the second sprocket being also disposed beneath plate 137. At its lower end, gathering chain 141 passes about a sprocket wheel 142 rotatably mounted at the under-face of plate 137. Gathering chain 134 is trained about a lower sprocket 143 rotatably mounted at the upper face of plate 137 at the forward end thereof. The gathering chains 134 and 141 pass about idlers 144, suitably disposed above and below plate 137 to hold the inner runs of the gathering chains in proper relation to the snapping roll 125. The shaft 140 is provided with a universal joint 145 and is driven from counter-shaft 115 by means of a sprocket chain 146 which passes about a sprocket wheel 147 secured on this counter-shaft, this chain also passing about a sprocket wheel 148 secured on shaft 140.

A gathering chain 149 is disposed within structure 130 and is trained, at its forward end, about a sprocket 150. At its upper end, chain 149 is trained about a sprocket wheel 151 secured upon a stub shaft mounted for rotation in a mounting bracket 152 suitably secured to plate 153. A bevel gear 154 is secured upon the upper end of this stub shaft and meshes with a bevel pinion 155 secured upon a shaft 156, which, like shaft 140, is rotatably mounted in bearing bracket 152 and is disposed fore and aft of the implement.

Shaft 156 comprises a forward universal joint 157 and a rearward joint 158. The portion of this shaft disposed rearwardly of joint 158 is rotatably mounted in a U-shaped bracket 159 suitably secured to cross-bar 117. A sprocket wheel 160 is secured on shaft 156, within bracket 159, and receives a sprocket chain 161 which is trained about this wheel and about a sprocket wheel 162 secured upon the rearward end of counter-shaft 140. The gathering chain 149 is thus driven from counter-shaft 115a through counter-shaft 140. Chain 149 passes about idlers 163 which serve to hold the inner run of this chain in proper relation to the inner run of chain 134 and chain 141. The gathering chains act to draw the corn stalks inwardly or rearwardly toward the snapping rolls, in a known manner.

The ears of corn which have been snapped from the stalks are directed by means of a deflector 164 into one side of a conveyor trough 165. A conveyor operates in this trough, this conveyor comprising a sprocket chain 166 and suitably disposed flights 167 carried thereby. At its upper end, the chain 166 passes about an idler sprocket 168 and, at its lower end, the chain passes about a sprocket 169 (Fig. 7) secured upon a stub shaft 170 rotatably mounted at its lower end in a bearing cup 171 suitably secured to plate 153. Shaft 170 is rotatably mounted, adjacent its upper end, through a bearing collar 172 suitably secured to a plate 173. A sprocket wheel 174 is secured upon the upper end of shaft 170 and the gathering chain 149 is trained about this sprocket wheel.

In this manner, the conveyor is driven from the gathering chain. This provides a simple and efficient drive for the conveyor. The construction of the conveyor trough, the conveyor and associated parts is, in general, known and need not be further illustrated nor described in detail. The snapped ears are delivered by the conveyor to the hopper 89 from which they are delivered to the husking rolls, as previously described.

In Figure 8, we have illustrated the relation between axle 4 and the universal joint 75, which is of importance. We have found, that if the pivotal axis of universal joint 75 be disposed substantially in the vertical plane of axle 4, the telescoping movement of section 77 of the transmission shaft, in the tilting of the implement on the axis of axle 4, is objectionably great. By dispensing joint 75 forwardly of the axle, this telescoping movement is reduced. On the other hand, if universal joint 75 be disposed too far forwardly of axle 4, then the universal joints are disposed at undesirable angles, such as would tend to interfere with their most efficient operation, in the tilting of the frame. It is possible, however, to so dispose universal joint 75 as to avoid both of these objections. In Fig. 8 we have illustrated this joint as being so disposed that a line a—b connecting the axis of axle 4 and the pivotal axis of the joint, is disposed at an angle of approximately 32½° to the horizontal, indicated by the line c—d. This angle can be varied within limits, but preferably should be not less than 30° and not greater than 50°.

Disposing the universal joint 75 in this manner avoids objectionable telescoping movement of section 77 of the transmission shaft, and also avoids disposing the universal joints at objectionable angles during tilting of the frame.

What we claim is:

1. In an agricultural implement, a supporting frame mounted for fore and aft tilting movement on a transverse axis, said frame extending forwardly and rearwardly from said axis, mechanisms carried by the frame, and means for tilting the frame and for securing it in adjustment comprising rearwardly diverging members connected to the frame in front and in rear of the axis of tilting movement thereof.

2. In an agricultural implement, a supporting frame mounted for fore and aft tilting movement on a transverse axis, said frame extending forwardly and rearwardly from said axis, mechanisms carried by the forward portion of the frame, mechanisms carried by the rearward portion of the frame and counterbalancing the forward mechanisms, and means comprising spaced members disposed one above the other and connected to the frame in front and in rear of the axis of tilting movement thereof for tilting said frame and securing it in adjustment.

3. In an agricultural implement, an axle and ground wheels mounted thereon, a frame mounted for fore and aft tilting movement on the axis of said axle, a draft member connected to said implement for relative turning movement on an axis coincident with the axis on which the frame tilts, means for tilting the frame and for securing it in adjustment comprising rearwardly diverging members disposed substantially in a vertical plane, and mechanisms mounted on the frame.

4. In an agricultural implement, an axle and ground wheels mounted thereon, a frame mounted for fore and aft tilting movement on the axis of the axle, a draft member connected to the axle for relative turning movement on the axis thereof, means for tilting the frame and for securing it in adjustment comprising a pair of members, one connected to the main frame at a point forward of said axis and the other connected thereto at a point in rear of said axis, and mechanisms mounted on the frame.

5. In an agricultural implement, an axle and ground wheels mounted thereon, a main frame mounted on the axle for fore and aft tilting movement of the axis thereof, a draft member connected to the axle for relative turning movement on the axis thereof, the main frame including forwardly and rearwardly extending frame members and rear upright members, an adjusting frame comprising a pair of connected rearwardly extending members, one being secured to one of said forwardly and rearwardly extending members and the other to one of said upright members for tilting the main frame, cooperating means carried by the adjusting frame and the draft member for securing the main frame in adjustment about the axis of tilting movement thereof, and mechanisms mounted on the frame.

6. In an agricultural implement, an axle and ground wheels mounted thereon, a main frame mounted on the axle for fore and aft tilting movement on the axis thereof and comprising front and rear frame bars, vertical bars, and a reenforcing diagonal bar, a draft member connected to the axle for relative turning movement on the axis thereof, an adjusting frame comprising a pair of members, one connected with said diagonal bar and the other connected with one of said vertical bars for tilting the main frame, cooperating means carried by the adjusting frame and the draft member for securing the main frame in adjustment about the axis of tilting movement thereof, and mechanisms mounted on the frame.

7. In an agricultural implement, an axle and ground wheels mounted thereon, a frame mounted for fore and aft tilting movement on the axis of said axle, a draft member connected to the axle for relative turning movement on the axis thereof, a power shaft mounted on the frame, a transmission shaft mounted on the draft member and adapted for connection to a driven shaft of a tractor, said transmission shaft comprising a telescoping section, a universal joint connecting the rearward end of the transmission shaft to the forward end of the power shaft, mechanisms on the frame, driving connections between said mechanisms and the power shaft, and means for tilting the frame and securing it in adjustment.

8. In an agricultural implement, an axle and ground wheels mounted thereon, a frame mounted for fore and aft tilting movement on the axis of said axle, a draft member connected to the axle for relative turning movement on the axis thereof, a power shaft mounted on the frame and extending fore and aft thereof with its forward end disposed forwardly of the axle, a transmission shaft mounted on the draft member and adapted for connection to a driven shaft of a tractor, said transmission shaft comprising a telescoping section, a universal joint connecting the rearward end of the transmission shaft to the forward end of the power shaft, mechanisms on the frame and disposed forwardly and rearwardly of the axle, counter shafts on the frame and disposed substantially parallel to the power shaft, driving connections between said mechanisms and the power shaft and the counter shafts, direct drives between the power shaft and the counter shafts, and means for tilting the frame and securing it in adjustment.

9. In an agricultural implement, a wheel mounted frame, a draft member connected to the frame, a transmission shaft mounted on said member, a power shaft mounted on the frame fore and aft thereof and having driving connection at its forward end to the transmission shaft, counter shafts on the frame disposed substantially parallel to the power shaft, direct drives separately connecting the countershafts to the power shaft, mechanisms on the frame, and driving connections between said mechanisms and the counter shafts.

10. In an agricultural implement, a wheel mounted frame, a draft member connected to the frame, a transmission shaft mounted on said member, a power shaft mounted on the frame fore and aft thereof and having driving connection at its forward end to the transmission shaft, counter shafts on the frame disposed substantially parallel to the power shaft, separate chain and sprocket drives between the power shaft and the counter shafts, mechanisms on the frame, and driving connections between said mechanisms and the counter shafts.

11. In a corn harvester, a wheel mounted frame, a draft member connected to the frame, a transmission shaft mounted on said member, a power shaft mounted at one side of the frame fore and aft thereof and having driving connection at its forward end to the transmission shaft, an elevator extending laterally from said side of the frame and driven from the power shaft, husking means at the back of the frame and substantially aligned transversely thereof with the elevator, a counter shaft mounted on the frame and having driving connections with the husking means, snapping rolls extending forwardly of the frame and gathering chains and a conveyor associated with said rolls, the rolls and the associated chains and conveyor being at the other side of the frame, a second counter shaft having driving connections with the rolls and the chains and the conveyor, the counter shafts being substantially parallel to the power shaft, and direct drives between the respective counter shafts and the power shaft.

12. In a corn harvester, a wheel mounted frame, a draft member connected to the frame, a transmission shaft mounted on said member, a power shaft mounted at one side of the frame fore and aft thereof and having driving connection at its forward end to the transmission shaft, an elevator extending laterally from said side of the frame and driven from the power shaft, husking means at the back of the frame and substantially aligned transversely thereof with the elevator, a counter shaft mounted on the frame and having driving connections with the husking means, snapping rolls extending forwardly of the frame and gathering chains and a conveyor associated with said rolls, the rolls and the associated chains and conveyor being at the other side of the frame, a second counter shaft having driving connections with the rolls and the chains and the conveyor, the counter shafts being substantially parallel to the power shaft, and chain and sprocket drives between the respective counter shafts and the power shaft.

13. In an agricultural implement, an axle and wheels mounted thereon, a frame mounted for fore and aft tilting movement on the axis of the axle, a draft member connected to the axle for relative turning movement about the axis thereof, a power shaft mounted on the frame and disposed fore and aft thereof, a transmission shaft mounted on said member for rotation and for endwise sliding movement, a universal joint connecting the forward end of the power shaft to the rearward end of the transmission shaft, mechanisms on the frame, driving connections between said mechanisms and the power shaft, and means for tilting the frame and securing it in adjustment.

14. In combination with a tractor having a power take-off shaft, an agricultural implement comprising a wheel mounted axle, a frame mounted for fore and aft tilting movement on the axis of the axle, a draft member hitched at its forward end to the tractor and having its rearward end connected to the axle for relative turning movement about the axis thereof, a power shaft mounted on the frame fore and aft thereof, a transmission shaft comprising a rearward section mounted on said draft member for rotation and for endwise movement and a forward telescoping section, said telescoping section having universal connections with the tractor shaft and with the forward end of said rearward section, mechanisms on the frame, a universal joint connecting the forward end of the implement power shaft to the rearward end of the transmission shaft, driving connections between said mechanisms and the implement power shaft, and means for tilting the frame and for securing it in adjustment.

15. In combination with a tractor having a power take-off shaft, a wheel mounted agricultural implement comprising a frame mounted for fore and aft tilting movement on an axis, a draft member hitched at its forward end to the tractor and having its rearward end connected to the implement for relative turning movement about said axis, a power shaft mounted on the frame fore and aft thereof, mechanisms on the frame and driven from the implement power shaft, a transmission shaft comprising a rearward section mounted on said draft member for rotation and for endwise movement, said transmission shaft comprising a forward telescoping section having universal connections with the tractor shaft and with the forward end of said rearward section, a universal joint connecting the forward end of the implement power shaft to the rearward end of the transmission shaft, and means for tilting the frame and for securing it in adjustment.

16. In a corn harvester comprising a power driven countershaft, snapping rolls and associated gathering chains and conveyor, means for driving the rolls from said countershaft, and means for driving the gathering chains and conveyor from said countershaft, said means comprising a drive shaft for the conveyor, and a sprocket wheel secured on said shaft, one of the gathering chains being trained about the sprocket wheel and driving the same and said shaft.

17. In a harvesting machine, an axle, supporting wheels mounted on the axle, a frame mounted for tilting movement on the axis of said axle, a draft member connected to the axle for relative turning movement on the axis thereof, a driven shaft on the frame, mechanisms on the frame driven from said shaft, a transmission shaft on the draft member, and a universal joint connecting the shafts and disposed in proximity to the axle and forwardly thereof.

18. An agricultural implement comprising a harvester having a tiltable frame and a driven shaft, a draft member pivotally connected to said frame, said frame being adapted to be tilted relative to said draft member, and a power transmitting connection for the driven shaft supported on the draft member and including a universal joint disposed forward of and above the pivotal connection between said draft member and frame.

19. An agricultural implement comprising a harvester having a tiltable frame and a driven shaft, a draft member pivotally connected to said frame, said frame being adapted to be tilted relative to said draft member, the axis about which the frame is tiltable coinciding with the pivotal axis of said draft member, and a power transmitting connection for the driven shaft including a universal joint disposed forward of and above the pivotal connection between said draft member and frame.

20. An agricultural implement comprising a harvester having a tiltable frame and a driven shaft, a wheel supported axle about which the frame may tilt, a draft member pivotally connected to said frame, said frame being adapted to be tilted relative to said draft member, the axis of the axle about which the frame is tiltable coinciding with the pivotal axis of said draft member, and a power transmitting connection for the driven shaft including a universal joint disposed forward of and above the pivotal connection between said draft member and frame.

21. In a harvesting machine, an axle, supporting wheels mounted on the axle, a frame mounted for tilting movement on the axis of said axle, a draft member connected to the axle for relative turning movement on the axis thereof, a driven shaft on the frame, mechanisms on the frame driven from said shaft, a transmission shaft on the draft member, and a universal joint connecting the shafts and disposed in proximity to the axle and forwardly thereof, a line joining the universal joint and the axle at an angle to the horizontal not less than 30° nor greater than 50°.

22. An agricultural machine comprising a wheel supported axle, a supporting frame mounted thereon, said frame including longitudinal members extending forwardly of said axle, transverse members connected with said longitudinal members in rear of said axle, and a diagonal brace member connected at its forward end with one of said longitudinal members, at its rear end with both of said transverse members and intermediate its ends with said axle, operating mechanism carried by said longitudinal members forward of said axle, and operating mechanism carried by said transverse members rearwardly of said axle.

23. An agricultural machine comprising a wheel supported axle, a supporting frame mounted thereon, said frame including longitudinal members extending forwardly and rearwardly of said axle, a pair of transverse members connected with said longitudinal members in rear of said axle, and a diagonal brace member connected at its forward end directly to one of said longitudinal members and at its rear end to both of said transverse members, and a sleeve carried by said brace member in which said axle is received.

24. An agricultural machine comprising a wheel supported axle, a supporting frame mounted thereon, said frame including longitudinal members extending forwardly of said axle, transverse members connected with said longitudinal members in rear of said axle, and a diagonal brace member connected at its forward end with one of said longitudinal members and at its rear end with both of said transverse members, and a tilting frame rigidly secured to the supporting frame and including spaced members, one of which is connected with said diagonal brace member.

25. An agricultural machine comprising a wheel supported axle, a supporting frame mounted thereon, said frame including longitudinal members extending forwardly of said axle, transverse members connected with said longitudinal members in rear of said axle, and a diagonal brace member connected at its forward end with one of said longitudinal members and at its rear end with both of said transverse members, a sleeve carried by said brace member in which said axle is received, and a tilting frame rigidly secured to the supporting frame and including vertically spaced members, one of which is connected with said diagonal brace member forward of said sleeve.

26. In a corn harvester, a wheel mounted frame, a draft member connected to the frame, a transmission shaft, a power shaft mounted at one side of the frame fore and aft thereof and having driving connection at its forward end to the transmission shaft, an elevator extending laterally from said side of the frame and driven from the power shaft, husking means at the back of the frame and substantially aligned transversely thereof with the elevator, a counter shaft mounted on the frame and having driving connections with the husking means, snapping rolls extending forwardly of the frame and gathering chains and a conveyor associated with said rolls, the rolls and the associated chains and conveyor being at the other side of the frame, a second counter shaft having driving connections with the rolls and the chains and the conveyor, the counter shafts being substantially parallel to the power shaft, and direct drives between the respective counter shafts and the power shaft.

27. In a corn harvester, a wheel mounted frame, a draft member connected to the frame, a transmission shaft, a power shaft mounted at one side of the frame fore and aft thereof and having driving connection at its forward end to the transmission shaft, an elevator extending laterally from said side of the frame and driven from the power shaft, husking means at the back of the frame and substantially aligned transversely thereof with the elevator, a counter shaft mounted on the frame and having driving connections with the husking means, snapping rolls extending forwardly of the frame and gathering chains and a conveyor associated with said rolls, the rolls and the associated chains and conveyor being at the other side of the frame, a second counter shaft having driving connections with the rolls and the chains and the conveyor, the counter shafts being substantially parallel to the power shaft, and chain and sprocket drives between the respective counter shafts and the power shaft.

28. An agricultural implement comprising a harvester having a tiltable frame and a driven shaft, a draft member pivotally connected to said frame, said frame being adapted to be tilted relative to said draft member, and a power transmitting connection for the driven shaft including a universal joint connected with the driven shaft at a point spaced from the vertical plane of the pivotal axis of said draft member, a rotatable shaft connected at its rear end to the universal joint and journaled at its forward end for sliding endwise movement on the draft member, and a telescoping shaft section connected to the forwardmost end of said rotatable shaft.

29. An agricultural implement comprising a harvester having a tiltable frame and a driven shaft, a draft member pivotally connected to said frame, said frame being adapted to be tilted relative to said draft member, and a power transmitting connection for the driven shaft including a universal joint connected with the driven shaft at a point spaced from the vertical plane of the pivotal axis of said draft member, a rotatable shaft connected at its rear end to the universal joint, means on the draft member and serving as a bracket for supporting the forward end of said shaft for sliding endwise movement relative thereto, and a telescoping shaft section connected to the forwardmost end of said rotatable shaft.

30. In a corn harvester, a wheel mounted frame, a draft member connected with the frame, a transmission shaft, a power shaft mounted on the frame fore and aft thereof and having driving connection at its forward end with the transmission shaft, husking means at the back of the frame, a rearwardly extending counter shaft mounted on the frame and having driving connections with the husking means, snapping rolls extending forwardly of the frame, a forwardly extending counter shaft having driving connections with the snapping rolls, both of the counter shafts being substantially parallel to the power shaft, direct drive means extending between the forward end of said rearwardly extending counter shaft and said power shaft, and direct drive means extending between the rear end of said forwardly extending counter shaft and said power shaft.

31. In a harvesting machine, an axle, supporting wheels mounted on the axle, a frame mounted for tilting movement on the axis of said axle, husking means at the back of the frame rearwardly of said axle, a rearwardly extending counter shaft having its forward end disposed adjacent said axle and its rear end operatively connected to drive said husking means, snapping rolls extending forwardly of the frame, a forwardly extending counter shaft having its rear end disposed adjacent said axle and its forward end operatively connected to drive said rolls, a power shaft mounted on said frame fore and aft thereof and spaced vertically of said axle, a transmission shaft connected with the forward end of said power shaft, and direct drive means extending from the rear end of said power shaft to the forward end of said rearwardly extending counter shaft and to the rear end of said forwardly extending counter shaft.

32. In a harvesting machine, an axle, supporting wheels mounted on the axle, a frame mounted for tilting movement on the axis of said axle, a draft member connected with the axle adjacent one side of the frame, a transmission shaft, a power shaft mounted at said one side of the frame fore and aft thereof and substantially over said axle, said power shaft having driving connection with said transmission shaft, husking means at the back of said frame rearwardly of said axle and extending alongside the latter transversely of the frame, a rearwardly extending counter shaft having its forward end disposed adjacent said axle and its rear end operatively connected with said husking means, snapping roll means extending forwardly at the other side of said frame alongside said draft member, a forwardly extending counter shaft having its rear end disposed adjacent said axle and its forward end operatively connected with said snapping roll means, and direct drive means disposed adjacent but rearwardly of said axle for operatively connecting said counter shafts with said power shaft.

WILBUR J. COULTAS.
NORMAN F. ANDREWS.

CERTIFICATE OF CORRECTION.

Patent No. 1,967,498.     July 24, 1934.

WILBUR J. COULTAS, ET AL.

It is hereby certified that error appears in the printed specification of the above numbered patent requiring correction as follows: Page 3, line 5, for Draft" read draft; and line 124, for "Coutlas" read Coultas; page 5, line 58, claim 5, for "of" read on; and that the said Letters Patent should be read with these corrections therein that the same may conform to the record of the case in the Patent Office.

Signed and sealed this 11th day of September, A. D. 1934.

Leslie Frazer (Seal)     Acting Commissioner of Patents.

mission shaft, husking means at the back of the frame, a rearwardly extending counter shaft mounted on the frame and having driving connections with the husking means, snapping rolls extending forwardly of the frame, a forwardly extending counter shaft having driving connections with the snapping rolls, both of the counter shafts being substantially parallel to the power shaft, direct drive means extending between the forward end of said rearwardly extending counter shaft and said power shaft, and direct drive means extending between the rear end of said forwardly extending counter shaft and said power shaft.

31. In a harvesting machine, an axle, supporting wheels mounted on the axle, a frame mounted for tilting movement on the axis of said axle, husking means at the back of the frame rearwardly of said axle, a rearwardly extending counter shaft having its forward end disposed adjacent said axle and its rear end operatively connected to drive said husking means, snapping rolls extending forwardly of the frame, a forwardly extending counter shaft having its rear end disposed adjacent said axle and its forward end operatively connected to drive said rolls, a power shaft mounted on said frame fore and aft thereof and spaced vertically of said axle, a transmission shaft connected with the forward end of said power shaft, and direct drive means extending from the rear end of said power shaft to the forward end of said rearwardly extending counter shaft and to the rear end of said forwardly extending counter shaft.

32. In a harvesting machine, an axle, supporting wheels mounted on the axle, a frame mounted for tilting movement on the axis of said axle, a draft member connected with the axle adjacent one side of the frame, a transmission shaft, a power shaft mounted at said one side of the frame fore and aft thereof and substantially over said axle, said power shaft having driving connection with said transmission shaft, husking means at the back of said frame rearwardly of said axle and extending alongside the latter transversely of the frame, a rearwardly extending counter shaft having its forward end disposed adjacent said axle and its rear end operatively connected with said husking means, snapping roll means extending forwardly at the other side of said frame alongside said draft member, a forwardly extending counter shaft having its rear end disposed adjacent said axle and its forward end operatively connected with said snapping roll means, and direct drive means disposed adjacent but rearwardly of said axle for operatively connecting said counter shafts with said power shaft.

WILBUR J. COULTAS.
NORMAN F. ANDREWS.

CERTIFICATE OF CORRECTION.

Patent No. 1,967,498.  July 24, 1934.

WILBUR J. COULTAS, ET AL.

It is hereby certified that error appears in the printed specification of the above numbered patent requiring correction as follows: Page 3, line 5, for Draft" read draft; and line 124, for "Coutlas" read Coultas; page 5, line 58, claim 5, for "of" read on; and that the said Letters Patent should be read with these corrections therein that the same may conform to the record of the case in the Patent Office.

Signed and sealed this 11th day of September, A. D. 1934.

Leslie Frazer (Seal)  Acting Commissioner of Patents.